Figure 1:
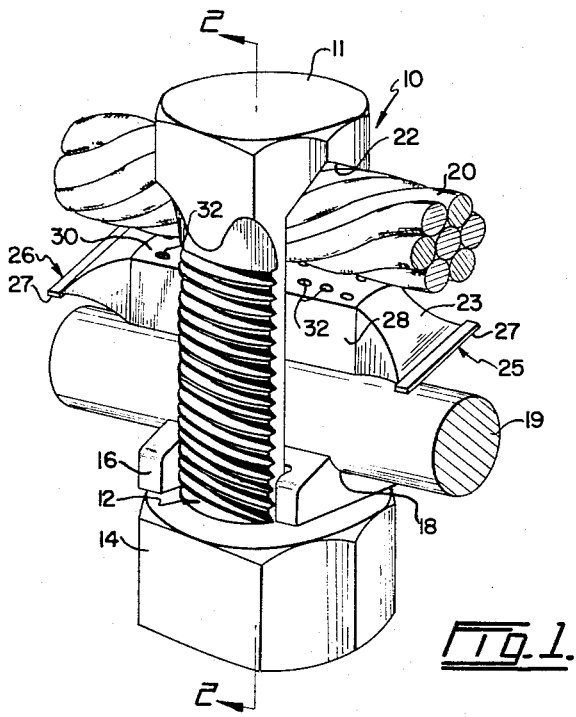

Dec. 12, 1967  G. REEVES  3,358,263

ANTI-CORROSIVE SPACER

Filed March 23, 1966

INVENTOR
GORDON REEVES
BY
Featherstonhaugh & Co.
ATTORNEYS under Patent Office
3,358,263
Patented Dec. 12, 1967

3,358,263
ANTI-CORROSIVE SPACER
Gordon Reeves, Mermaid St.,
Sechelt, British Columbia, Canada
Filed Mar. 23, 1966, Ser. No. 536,820
5 Claims. (Cl. 339—115)

This invention relates to spacers normally employed in cable clamp connectors to space apart electrical cables to be connected.

In the connecting of electrical cables, it is common to employ a clamp by means of which the cables may be clamped in parallel against an electrically conductive spacer sandwiched between them. The purpose of the spacer is two-fold, firstly to provide a connection in which the contact surface between the cables is at least as large as the cross sectional area of them and, consequently, the spacer is provided with grooves in which the cables are calculated to mate the curvature of the cables, thereby providing a large surface or contact area, and secondly to keep cables of different metals apart to slow corrosion and oxidation.

Spacers have heretofore been of solid construction and, consequently, if the grooves therein do not exactly match the curved surfaces of the cables, the preferred or desirable fit may not always be achieved, resulting sometime in a heating of the cables at their point of connection.

The joining of cables, especially where two cables of different metals are to be joined or where a clamp or the like of a different metal than either of the cables is to be used, usually results in the corrosion and oxidation of the cables and connector elements due to electrolytic or galvanic action. With a consequent lessening of the efficiency of the elements at the connection and a "freezing" of the movable parts of the connector, it has long been the practice to smear both the connector and cables with a corrosion inhibitive compound, having a magnesium or zinc base, before the connection is made. This aids in the prevention of corrosion, however, very often the application of the compound is not done in the workman-like manner and the connectors and the cables may not be adequately protected.

The present invention provides a spacer which is eminently suited for making an electrical connector when used with a split bolt or two bolt clamp connector. When the connector is tightened around the electrical cables, it automatically molds itself to the contours of the cables to thereby provide a highly desirable large contact area.

The present invention also provides a spacer which, when the connector is tightened down, spreads a corrosive inhibitive compound over the cables to be joined.

The present invention comprises an elongated tube formed of a malleable electro-conductive metal insertable between a pair of parallel electro-conductive cables and adapted to deform in cross section when the cables are moved towards each other, means to confine the tube to prevent lateral deformative movement thereof in a direction away from the cables to thereby mold the tube to the cross sectional configuration of that portion of the cable to which it lies adjacent, including a liquidate corrosion inhibitive substance normally confined within the tube, the latter being provided with passages formed through its walls adjacent the cables to permit the ejection of said substance as the tube is deformed.

Figures 2, 3:
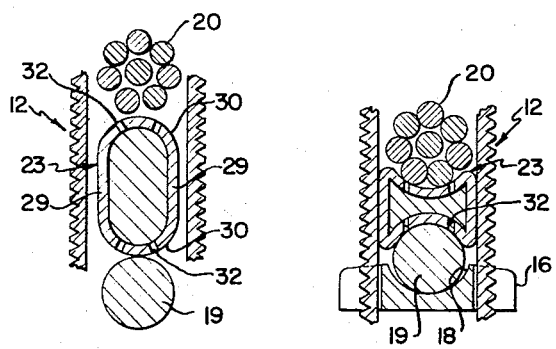

In the drawings which illustrate the invention,
FIGURE 1 is an isometric view of a split bolt connector, showing the spacer in position prior to the clamping of the connector over the cables.
FIGURE 2 is a sectional view of FIGURE 1 taken on line 2—2 thereof, prior to the tightening of the connector upon the cables, and FIGURE 3 is similar to FIGURE 2, showing the position assumed by the spacer when the connector has been partially tightened down over the cables.

Referring to the drawings, the cable connector employed and indicated by the numeral 10, is of the type commonly called a split bolt connector having a head 11, a bifurcated or split shank 12, the latter being threaded to threadedly receive a nut 14. In most connectors of this nature, there is also provided a pressure plate 16 which slidably rides on a nut 14 between the bifurcated portions of the shank 12. The pressure plate is provided with a groove 18 which serves as a seat for the lowermost one 19 of a pair of cables 19 and 20, while the undersurface 22 of the head is also grooved to serve as a seat for cable 20. Both seats are shaped so as to provide the largest possible contact surfaces between the pressure plate 16 and the head 11 of the bolt. It is also preferred that the connector shall be made of a highly electro-conductive material, such as brass or bronze.

The spacer, herein indicated by the numeral 23, is also formed from a highly electro-conductive but malleable material, such as aluminum or the like, which is capable of being extensively deformed without splitting or breaking and is of hollow construction being formed as an elongated tube filled with a corrosion inhibitive substance, the latter being any one of many types now in use, and preferably having a paste-like consistency. The end sections 25 and 26 of the spacer are folded transversely and crimped, so as to provide an effective closure, said end sections by reason of the transverse fold extending laterally outwardly beyond the tubular portion 28 of said spacer. The latter or tubular section 28 is shaped so that it presents in cross section a rectangularly shaped body having planar and parallel side walls 29 and rounded cable contacting top and bottom walls 20, the latter being provided with a plurality of perforations 32 which may be in the form of slits or small holes. The perforations 32 are preferably located in a pair of parallel rows on each of the walls 30, extending longitudinally of the spacer, and spaced on either side of the longitudinal centerline of each of said walls 30. It is to be understood that to connect cables of varying sizes, it is usual to employ connectors of various sizes. Consequently, it is necessary to employ spacers of varying sizes dependent entirely upon the size of the connector to be used. The spacer chosen relative to the connector shall be of a length so that when it is inserted in the connector between the cables thereof, the end sections 25 and 26 extend outwardly beyond the confines of the connector, and the width of the spacer, that is, the distance between the flat side walls 29 thereof shall be sufficient so that it will just slidably fit into the bifurcated shank 12, said side walls 29 co-acting with the usually flat walls of the bifurcated shank to prevent rotation of the spacer relative to the connector. It will be seen, therefore, that the flattened end sections 27 being wider than the distance between said side walls 29 will prevent the spacer from sliding longitudinally out of the shank 12. It is also to be understood that the thickness of the walls of the tubular spacer shall be such that they have adequate current carrying capacity.

In the use of the spacer, the cables 19 and 20 are positioned within the bifurcated shank 12 of the connector 10, sandwiching between them the spacer 23, the latter being positioned so that the end sections 25 and 26 extend beyond the confines of the shank and the side walls 29 slidably fitting the walls of the shank 12. The pressure plate 16 is then moved upwardly by tightening the nut 14 to move the cables together, squeezing the spacer between them. As the spacer is comprised of a malleable metal, the rounded walls 30 will collapse from a position as shown in FIGURE 2 to a position as shown in FIGURE 3. Ordinarily, the side walls 29 would move outwardly, but as they are confined by the walls of the shank, the resultant configuration of the spacer will be such that said end walls will move themselves to the circular configuration of the cables and, at the same time due to the pressure exerted, the corrosion inhibitive substance, being of a paste-like consistency, will be ejected through the perforations and flow over the contact surfaces of the cables. The nut 14 then may be backed off a turn or two and the connector 10 rotated about the cables 19 and 20 one half turn in both directions several times to thoroughly coat cables and inside surfaces of the connector with the corrosion inhibitor. The nut is then re-tightened until both cables are firmly pressed against the deformed spacer. Ordinarily, there will be ejected, a super-abundance of the inhibitor which will flow down the shank on to the pressure plate and nut. Therefore, the action of backing off the nut and re-tightening it will spread the inhibitor between the threads of the nut and the threads of the shank to prevent their freezing together.

In the foregoing description, reference only has been made to the use of the spacer in connection with a split bolt type of clamp. However, its use is not so restricted. It will be obvious that spacers constructed in accordance with the invention may be used in any electrical clamp connector, the size and shape being determined only by the constructional difference in the types of clamps in which, it is intended, they shall be employed.

What I claim as my invention is:

1. A spacer for a cable clamp connector, the latter having spaced cable receiving reinforcing walls comprising, an elongated tube formed of a malleable electro-conductive metal insertable between a pair of parallel electroconductive cables to be connected and being adapted to deform in cross section when the cables are moved towards each other, the walls of the connector confining the tube to induce lateral deformative movement thereof around the cable.

2. A spacer as claimed in claim 1 including a liquidate corrosion inhibitive substance normally confined within the tube, the latter being provided with passages formed through its wall adjacent the cables to permit the ejection of said substance as the tube is deformed.

3. A spacer for a cable clamp connector, the latter having spaced cable confining walls comprising in combination, an elongated tubular closed container formed of a malleable electroconductive metal having a pair of planar walls shaped to slidably fit between the confining walls of the connector, said spacer being insertable between a pair of cables to be connected and being adapted to deform in cross section when the cables are moved towards each other, the walls of the connector serving as abutment surfaces to prevent lateral deformative movement of the walls of the container in a direction away from the cables and thereby induce deformative movement of the walls of the container confronting the cables so as to mold said latter walls to the cross sectional configuration of said cables, said latter wall being provided with passages formed therethrough, and a liquidate corrosion inhibitive substance normally confined within the container and adapted to be ejected through the passages when said container is deformed.

4. A spacer as claimed in claim 3 in which the container has flattened end sections extending transversely to its longitudinal axis and outwardly beyond its planar walls, said end sections normally being located, when the spacer is positioned to the connector, outside of the confines of the latter's confining walls, said end sections serving as stops engageable with said walls to prevent longitudinal movement of the spacer relative said confining walls.

5. A spacer for a cable clmap connector, the latter having spaced cable confining walls comprising in combination, an elongated closed container formed of a malleable electroconductive metal, having a tubular body portion and transversely extending flattened end sections, said body portion having a pair of planar walls shaped to slidably fit between the confining walls of the connector, said end portion being arranged, when the container is positioned in the connector, to extend laterally outwardly at each end thereof and transversely beyond the walls, said spacer being insertable between a pair of cables to be connected and being adapted to deform in cross section when the cables are moved towards each other, the walls of the connector serving as abutment surfaces to prevent lateral deformative movement of the walls of the container in a direction away from the cables and thereby induce deformative movement of the walls of the container confronting the cables so as to mold said latter walls to the cross sectional configuration of said cables, said latter walls being provided with passages formed therthruogh, and a liquidate corrosion inhibitive substance normally confined within the container and adapted to be ejected through the passages when said container is deformed.

References Cited

UNITED STATES PATENTS

| 1,643,110 | 9/1927 | Briggs | 24—123 |
| 1,984,518 | 12/1934 | Carpenter | 339—115 |
| 2,148,960 | 2/1939 | Pierce | 339—244 |
| 3,243,758 | 3/1966 | Frante et al. | 339—115 |

FOREIGN PATENTS

| 52,959 | 7/1944 | France. |
| 565,845 | 11/1944 | Great Britain. |

RICHARD E. MOORE, *Primary Examiner.*

MARVIN A. CHAMPION, *Examiner.*